(No Model.)
J. L. RICKETTS.
ELECTRIC INDICATOR.
No. 451,226. Patented Apr. 28, 1891.
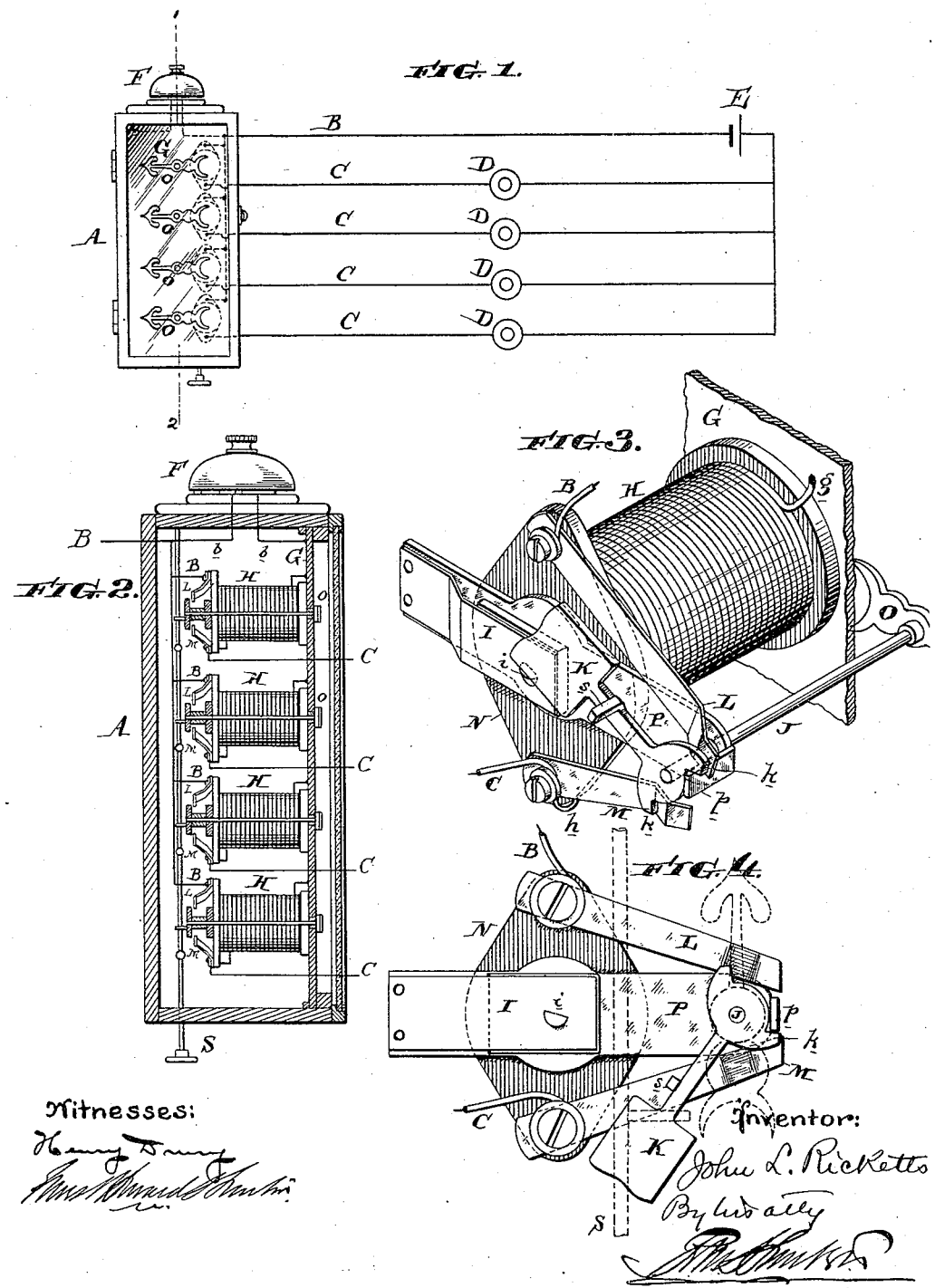
Witnesses:
Inventor:
John L. Ricketts
By his atty

UNITED STATES PATENT OFFICE.

JOHN L. RICKETTS, OF PHILADELPHIA, PENNSYLVANIA.

ELECTRIC INDICATOR.

SPECIFICATION forming part of Letters Patent No. 451,226, dated April 28, 1891.

Application filed November 28, 1890. Serial No. 372,854. (No model.)

*To all whom it may concern:*

Be it known that I, JOHN L. RICKETTS, of the city and county of Philadelphia, and State of Pennsylvania, have invented an Improvement in Electric Indicators, of which the following is a specification.

My invention has reference to electric indicators; and it consists of certain improvements which are fully set forth in the following specification and shown in the accompanying drawings, which form a part thereof.

The object of my invention is to provide suitable indicating apparatus for use in house purposes, for elevator work, &c., wherein the details of construction are simplified and made more positive in their action.

My object is, further, to so construct the apparatus that the resistance of the indicator-magnets in the line-circuit may be annulled or thrown into a shunt-circuit when the bell is ringing, so that as little resistance as possible is in the line, thus requiring but a small battery-current.

In practice by my improvements I am enabled to accomplish with one cell of battery what has heretofore required two or more cells.

The construction of my apparatus is such that in sending an impulse over the circuit the effective portion of the current passes through the indicator-magnet and by the return-circuit to the source of energy. Immediately upon energizing the indicating-magnet the indicator is operated and thereupon throws the bell-magnet into circuit, which receives the current, and the indicator-magnet is automatically thrown into shunt relation in the line and forms no resistance. By these improvements it is evident that we only have one of the magnets in direct circuit at any one moment through which the effective portion of the current must pass, and consequently the resistance is reduced to a minimum, thereby enabling the use of a very small battery-current.

My improvements, furthermore, relate to details of construction which are fully disclosed in the accompanying drawings, in which—

Figure 1 is a diagram illustrating an elevation of my improved indicator mechanism and the circuits therefor. Fig. 2 is a vertical section of the indicator mechanism, on line 1 2, embodying my invention. Fig. 3 is a perspective view of one of my indicator-magnets and connecting devices, and Fig. 4 is a rear elevation of same.

A is the indicator-box.

E is the electric battery. C are the circuits leading from the battery to the indicator-magnets.

D are the circuit-closers in said circuit C, and B is the return or ground circuit. The circuit C leads to a contact-spring M, supported on an insulator-head N, secured to one end of the magnet H, the other end of said magnet being supported by a ground-plate of metal G. This circuit connects with the coil of the magnet H at $h$, and the other end of the coil H connects with the ground-plate G at $g$. (See Fig. 3.)

O is an indicator finger or pointer, and is secured upon the end of a rock-shaft J, journaled at one end in the ground-plate G and at the other end in a plate P, secured to the end of the magnet or head N.

Upon the end of the rock-shaft J opposite to the pointer O is secured an arm K, having two projections $k$, acting as contacts for the contact-fingers M and L, and also acting as the stops in connection with the projection $p$ to limit the possible rocking motion of the arm K. I is a spring-armature, and is secured at one end to the plate P, and having its other end provided with a projection or catch $i$, which normally receives the arm K, as indicated in Fig. 3, and holds it in a raised position to maintain the pointer O in a horizontal position. When the arm K is raised to the position shown in Fig. 3, this projection $k$ is in contact with a contact-spring L, similar to M, but connected to the return-circuit B.

F is the alarm-bell, which has its usual magnet arranged in a circuit $b$, one end of which is connected with the ground-plate G and the other end connected to the return-circuit B, as indicated in Figs. 1 and 2.

S is a bar which may be operated by the hand to strike upon the projection $s$ of the arms K to raise them from the position shown in Fig. 4 to the position shown in Fig. 3 in resetting the indicator.

The operation will now be understood. If the circuit-closer D is operated, a current passes from the battery over the circuit C through the coil H to the ground-plate, thence through the core of the magnet and the rock-shaft J to the contact k, thence to the spring-contact L, and by the return-circuit B back to the battery. The magnet is energized and the armature I is attracted, liberating the arm K, which by gravity falls and moves the pointer O. When the arm K falls, it breaks the circuit with the contact-spring L, and forms a circuit with the contact-spring M. The current now passes by the circuit C over the contact-spring M, through the rock-shaft J and core of the magnet H to ground-plate, thence through the coils of the bell-magnet F to the return-circuit B, and thence to the battery. In this connection it will be seen that part of the current might traverse the coils of the magnet H, which would be in shunt relation with the circuit formed by the core of the magnet and the rock-shaft J, but would not in any sense form a resistance, but on the other hand would reduce the resistance. By putting the magnet-coil H in shunt with the core and rock-shaft it is in effect cut out of circuit. By this means it is seen that when the armature I is actuated there is no material resistance in the circuit but the coils of the magnet H, and when the bell F is actuated there is no material resistance in the circuit but the coils of the magnet of the bell. There may be as many of the indicating devices as desired, four being shown in Figs. 1 and 2. In this case separate circuits C run to the contact-springs M of the several indicator-magnets, and all of the contact-springs L of the several magnets are coupled together with the return-circuit B.

While I prefer the construction shown, it is evident that the minor details of my improvement may be modified without departing from the principles of my invention.

Having now described my invention, what I claim as new, and desire to secure by Letters Patent, is—

1. The combination of an indicator-magnet, an electric bell, a source of electrical energy, a circuit leading from the source of energy to the magnet of the indicator, a bell-circuit including the circuit-closer, a return-circuit leading from the magnets of the indicator and bell to the source of energy, and a switch device operated by the indicator-magnet for normally holding the bell-magnet in shunt relation with the line-circuit and upon energizing the indicator-magnet throwing it into direct circuit and putting the indicator-magnet into shunt relation with the line-circuit.

2. The combination of an indicator-magnet, an electric bell, a source of electrical energy, a circuit leading from the source of energy to the magnets of the indicator and bell, including the circuit-closer, a return-circuit leading from the magnets of the indicator and bell to the source of energy, and a switch device operated by the indicator-magnet for normally putting the bell-magnet in shunt relation in the line-circuit and upon energizing the indicator-magnet throwing the bell-magnet into direct circuit with the line and simultaneously therewith short-circuiting the indicator-magnet to reduce the resistance.

3. The combination of an indicator-magnet and an electric bell, a battery, a circuit including the battery-indicator magnet and bell-magnet, a circuit-closer in said circuit, and a gravity-actuated switch for simultaneously shunting the indicating-magnet and throwing the bell-magnet into circuit, or vice versa, and a catch operated by the indicator-magnet for holding said switch against action.

4. The combination of the indicator-magnet, a ground-plate to which said magnet is secured, a spring-actuated armature, a rock-shaft, a gravity-actuated arm secured to one end of the rock-shaft and held in an elevated position by the spring-armature and having a pointer or indicating device upon the other end, a contact secured to one end of the magnet-coil and to the line-circuit and with which the gravity-actuated arm makes electrical contact to short-circuit the magnet, an electrical connection between the other end of the coil of the magnet and the ground-plate, and a spring-contact connected with the return-circuit and with which the gravity-actuated arm makes electrical connection when in a raised position, whereby normally the coils of the magnet are in direct circuit and are thrown into a shunt-circuit immediately upon the energizing thereof to reduce the resistance.

5. The combination of the indicator-magnet, a ground-plate to which said magnet is secured, a spring-actuated armature, a rock-shaft, a gravity-actuated arm secured to one end of the rock-shaft and held in an elevated position by the spring-armature and having a pointer or indicator device upon the other end, a contact secured to one end of the magnet-coils and to the line-circuit and with which the gravity-actuated arm makes electrical contact to short-circuit the magnet, an electrical connection between the other end of the coil of the magnet and the ground-plate, a spring-contact connected with the return-circuit and with which the gravity-actuated arm makes electrical connection when in a raised position, an electric bell, and a circuit including the bell-magnet having one end connected with the ground-plate and the other end connected with the return-circuit, whereby normally the coils of the magnet are in direct circuit and are thrown into a shunt-circuit immediately upon the energizing thereof to reduce the resistance while the current is traversing the electric-bell magnet, and vice versa.

In testimony of which invention I have hereunto set my hand.

JOHN L. RICKETTS.

Witnesses:
 JOHN B. RICKETTS,
 ERNEST HOWARD HUNTER.